(12) United States Patent
Henry et al.

(10) Patent No.: US 7,054,530 B2
(45) Date of Patent: May 30, 2006

(54) LIMITED COMBUSTIBLE CABLES

(75) Inventors: James J. Henry, Downingtown, PA (US); Gregory S. O'Brien, Downingtown, PA (US); Richard J. Rockosi, Sewaren, NJ (US)

(73) Assignee: Arkema Inc., Philadelphia, PA (US)

( * ) Notice: Subject to any disclaimer, the term of this patent is extended or adjusted under 35 U.S.C. 154(b) by 6 days.

(21) Appl. No.: 10/755,504

(22) Filed: Jan. 12, 2004

(65) Prior Publication Data

US 2005/0154106 A1 Jul. 14, 2005

(51) Int. Cl.
*G02B 6/44* (2006.01)

(52) U.S. Cl. ............... 385/100; 524/442; 524/406; 524/545

(58) Field of Classification Search ........... 385/100; 524/545, 442, 406
See application file for complete search history.

(56) References Cited

U.S. PATENT DOCUMENTS

| | | | | |
|---|---|---|---|---|
| 4,804,702 A | * | 2/1989 | Bartoszek | 524/432 |
| 4,881,794 A | | 11/1989 | Bartoszek et al. | 350/96.23 |
| 4,898,906 A | | 2/1990 | Hannecart | 524/406 |
| 4,957,961 A | * | 9/1990 | Chandrasekaran et al. | 524/405 |
| 5,004,773 A | | 4/1991 | Simoens et al. | 524/178 |
| 5,919,852 A | * | 7/1999 | Peltz et al. | 524/406 |
| 2003/0019655 A1 | | 1/2003 | Gilles | 174/105 R |
| 2004/0190841 A1 | * | 9/2004 | Anderson et al. | 385/100 |

FOREIGN PATENT DOCUMENTS

| | | | |
|---|---|---|---|
| EP | 240675 A1 | * | 10/1987 |
| EP | 0634446 | | 1/1995 |
| EP | 634446 A1 | * | 1/1995 |
| EP | 0793239 | | 9/1997 |

* cited by examiner

*Primary Examiner*—David W. Wu
*Assistant Examiner*—Henry S. Hu
(74) *Attorney, Agent, or Firm*—Thomas F. Roland

(57) ABSTRACT

A PVDF-containing LC Cable wherein the Cable contains no more than about 50 weight % PVDF, based on the weight of the Cable, is provided.

7 Claims, No Drawings

LIMITED COMBUSTIBLE CABLES

BACKGROUND OF THE INVENTION

This invention relates to cables produced using polyvinylidene fluoride and/or their copolymers ("PVDF") capable of meeting the limited combustible requirements as defined in standard NFPA 90A (Standard for the Installation of Air Conditioning and Ventilation Systems), which Standard requires that such cables when tested by standard NFPA-259 have a potential heat value ("PHV") below 3500 BTU/pound and when tested by NFPA-255 have a smoke developed index ("SDI") below 50 and a flame developed index ("FDI") below 25. Such limited combustible cables ("LC Cables") are also referred to in industry as Duct Cables, CMD, 25/50/8, 25/50, CMP-50 Cables and/or by other references indicating compliance with the PHV, SDI and FDI requirements referenced in the NFPA 90A Standard for limited combustible materials.

To date, all LC Cables have been developed with fluorinated ethylene propylene ("FEP") resins for both their primary insulation and jacket components. Applicant is not aware of any LC Cables made commercially using PVDF in one or more of the components. In order to meet the ever more stringent standards for these products, it would be useful to find alternative resins which can provide improved properties. PVDF has historically been limited to applications where its poor dielectric properties do not interfere with the performance of a cable.

It has been understood in industry that PVDF compounds with high limited oxygen index ("LOI") values would be useful for plenum grade cables. Such high LOI compositions are taught, for example, by U.S. Pat. Nos. 4,898,906 and 5,919,852. The present invention has found that these earlier teachings are not applicable to LC Cables.

BRIEF SUMMARY OF THE INVENTION

PVDF-containing LC Cables are provided wherein the Cable contains no more than about 50 weight % PVDF, based on the weight of the Cable, such Cables generally having an LOI of from about 40 to about 90, preferably from about 43 to about 75. Compared to FEP-based LC Cables, the inventive Cables are found to give improved SDI and/or FDI values when one or more of the FEP Cable components (such as the jacket or primary insulation) are replaced by PVDF-based components, provided that the Cable contains no more than about 50 weight % PVDF, based on the weight of the Cable. In a preferred embodiment, one or more of the LC Cable components are comprised of PVDF and from about 0.02 to about 2.0 weight % (more typically from about 0.05 to about 1.0 weight %), based on the weight of the PVDF, of a flame or smoke suppressant (also referred as a char promoter) such as one or more of a tungstate, molybdate or silicate.

DETAILED DESCRIPTION

It has now been surprisingly found, as opposed to previous teachings, that improved LC Cable constructions result from the use of PVDF having a relatively low LOI, such as are achieved by the use of smaller amounts of flame and smoke suppressants. Testing has shown that there is a linear relationship between the amount of such suppressants and LOI for PVDF, so that the LOI, as determined by ASTM D2863, increases from about 40 to about 90, for example, as the amount of calcium tungstate added to PVDF gradually increases from about 0 up to about 1.5 weight %, while an LOI of about 43–75 can be achieved using up to about 0.6 weight % calcium tungstate.

The LC Cable constructions are generally referred to as either copper (electrical) or fiber (fiber optic) cable constructions. Typical cable constructions are taught, for example, in U.S. Pat. No. 4,804,702. The components of a cable may include a jacket, primary insulation, a shield tape, and may include various sub-components such as a strength member, film, buffer, separator, pull cord, sub-jacket, all well known in the industry, any one or more of which may be made of PVDF resin.

"PVDF" or PVDF resin or PVDF polymer refers not only to homopolymers of PVDF but also to copolymers prepared from at least about 75% by weight of vinylidene fluoride (VDF) monomer. Comonomers may include other fluorinated monomers such as: hexafluoropropylene (HFP), chlorotetrafluoroethylene (CTFE), tetrafluoroethylene (TFE), and vinyl fluoride. Preferred are the homopolymers and the copolymers prepared from VDF and HFP to which small amounts (up to about 5 weight percent, preferably about 0.01 to about 0.05 weight percent) of PTFE may be added. Minor amounts of other conventional additives, such as calcium carbonate, pigments, and the like may also be included. The preferred VDF polymer resins are those having a melt viscosity (according to ASTM D3835) in the range of about 20 to 27 at a shear rate of 100 sec-1 and a temperature of 232 degrees Centigrade. Examples of such polymers include ATOFINA Chemicals, Inc.'s KYNAR® 2851-00 (a copolymer prepared from VDF and HFP which has a melt viscosity of 23 to 27), KYNAR 2801-00 (a copolymer prepared from VDF and HFP which has a melt viscosity of 23 to 27), and KYNAR 3120-50 (a heterogeneous copolymer prepared from VDF and HFP which has a melt viscosity of 21 to 26). VDF polymer resins having a lower melt viscosity range will perform satisfactorily, but with slightly higher smoke generation. These polymer resins can be used in applications where the lower viscosity will improve the ability to produce the cable. These VDF polymer resins are those having a melt viscosity (according to ASTM D3835) in the range of 5 to 23 at a shear rate of 100 sec-1 and a temperature of 232 degrees Centigrade. Examples of such polymers include the base resins used to produce KYNAR grades 2900 (a copolymer prepared from VDF and HFP which has a melt viscosity of 6 to 12), 2950 (a copolymer prepared from VDF and HFP which has a melt viscosity of 6 to 12), and 2850-04 (a copolymer prepared from VDF and HFP which has a melt viscosity of 5 to 7.5). Since pure PVDF has a PHV of about 6200 BTU per pound, about 50 weight % is the maximum amount used in a LC Cable in order to meet the PHV limit of about 3500 BTU/pound. The amount of PVDF used can be increased slightly if additives are added to lower the caloric content of the resin.

The preferred flame and smoke reduction package uses calcium tungstate blended into the PVDF at a loading of about 0.02 to 2.0 percent, based on the weight of the PVDF, to produce a product with an LOI between about 40 and about 90. More typically, calcium tungstate will be added into the VDF polymer at a loading of about 0.05 to 1.0% to produce a product with an LOI between about 40 and about 81. The preferred addition of calcium tungstate into the VDF polymer is at a ratio of about 0.3 to 0.5% to produce an LOI between 67 and 71. The incorporation of calcium tungstate into PVDF is discussed in the aforementioned U.S. Pat. No. 5,919,852. The use of a powdered, synthetic calcium tungstate of high purity is preferred, such as is available commercially from the Chem-Met Company. The additive(s) can be blended into the polymer using conventional polymer milling and mixing equipment so as to provide a good dispersion of the additive(s) in the base polymer. Other flame and smoke suppressants can be used to produce the PVDF compound for LC Cables. For example, the calcium molybdate described in U.S. Pat. No. 4,898,906 was verified as being acceptable for such use. Aluminum silicates, described in U.S. Pat. No. 4,881,794, are also considered useful.

The invention is further illustrated by the following non-limiting examples which demonstrate the enhanced ultra low smoke properties of LC Cables produced using PVDF in the construction.

Two PVDF compositions were prepared and used for production of sample cables to evaluate the burning characteristics of the cable. The first composition was prepared from a powder blend of VDF-HFP copolymer (95/5 by weight) and with 0.5 weight percent calcium tungstate. The second composition was prepared from a powder blend of VDF-HFP copolymer (90/10 by weight) with 1.0 weight percent calcium tungstate. After the powder blends were compounded and pelletized, copper conductors were uninsulated using these two PVDF compositions and also with FEP. The method of applying the insulation layer was by pressure extrusion. The insulated conductors, in groups of two, were twisted together to produce "twisted pairs" for each insulator type. The twisted pairs were then jacketed using a tube-on cable jacket process with either FEP or a PVDF composition as shown in Table 1. The cable constructions included the following: FEP insulation/FEP jacket, FEP insulation/PVDF jacket, and PVDF insulation/PVDF jacket. The cables were Steiner Tunnel tested per NFPA-255 to determine the SDI and the FDI. Table 1 illustrates that PVDF can be compounded to have extremely low SDI and/or FDI, well below that observed from all FEP cables.

Additional cables were prepared and tested following the same procedures as cited above to verify the results previously reported. Two PVDF compositions were prepared and used for production of sample cables to evaluate the burning characteristics of the cable. The composition was prepared from a powder blend of VDF-HFP copolymer (95/5 by weight) and calcium tungstate. The first powder blend contained 0.5 weight percent calcium tungstate and the second powder blend contained 1.0 weight percent calcium tungstate. After the powder blends were compounded and pelletized, copper conductors were insulated using these two PVDF compounds and also with FEP. The method of applying the insulation layer was by pressure extrusion. The insulated conductors, in groups of two, were twisted together to produce "twisted pairs" for each insulator type. The twisted pairs were then jacketed using a tube-on cable jacket process with either FEP or a PVDF compound as shown in Table 2. The cable constructions included the following: FEP insulation/FEP jacket, FEP insulation/PVDF jacket and PVDF insulation/PVDF jacket. The cables were Steiner Tunnel tested per NFPA-255 to determine the SDI and the FDI. The results are shown in Table 2, and again they indicate that constructions with PVDF are superior to those using FEP in flame and smoke properties. A summary of these results can be found in Table 2.

TABLE 1

NFPA-225 PVDF vs. FEP

| | Cable Construction | | | | PVDF |
|---|---|---|---|---|---|
| Test # | Primary | Jacket | SDI | FDI | LOI |
| 1 | PVDF with 10% HFP and 1% Calcium Tungstate | PVDF with 10% HFP and 1% Calcium Tungstate | 23.5 | 0 | 80 |
| 2 | PVDF with 5% HFP and 0.5% Calcium Tungstate | PVDF with 5% HFP and 0.5% Calcium Tungstate | 4.8 | 0 | 70 |
| 3 | FEP | FEP | 21.6 | 1.6 | |
| 4 | FEP | PVDF with 5% HFP and 0.5% Calcium Tungstate | 2.9 | 0 | 70 |
| 5 | FEP | PVDF with 10% HFP and 1% Calcium Tungstate | 9.7 | 0 | 80 |

TABLE 2

NFPA-255 PVDF vs. FEP verification testing

| | Cable Construction | | | | PVDF |
|---|---|---|---|---|---|
| Test # | Primary | Jacket | FDI | SDI | LOI |
| 6 | FEP | FEP | 1.6 | 21.6 | |
| 7 | PVDF with 5% HFP and 1.0% Calcium Tungstate | PVDF with 5% HFP and 1.0% Calcium Tungstate | 0 | 10.7 | 80 |
| 8 | PVDF with 5% HFP and 0.5% Calcium Tungstate | PVDF with 5% HFP and 0.5% Calcium Tungstate | 0 | 2.9 | 70 |
| 9 | FEP | PVDF with 5% HFP and 1.0% Calcium Tungstate | 0 | 9.7 | 80 |
| 10 | FEP | PVDF with 5% HFP and 0.5% Calcium Tungstate | 0 | 4.8 | 70 |

Tests 7 and 8 were repeated except that calcium molybdate was substituted for calcium tungstate as the smoke and flame suppressant. The results were still satisfactory (SDI of 13.6 and 10.5, respectively), although not as good as with calcium tungstate.

Other tests were conducted per NPFA-259 on an electrical cable construction composition of this invention (a 95/5 VDF/HFP copolymer containing 0.5% calcium tungstate as in test 8) to verify that it had a potential heat value ("PHV") below 3500 BTU/pound. The cables tested consisted of either 2 conductors (one twisted pair) or 12 conductors (6 twisted pairs). Both cables passed, the single pair cable exhibiting a PHV of 3288 BTU/pound and the 6 twisted pair cable exhibiting a PHV of 2098 BTU/pound.

A coaxial construction was also tested consisting of a single copper conductor that contained a foamed FEP dielectric layer. A conductive braid was applied over the FEP conductor, then a PVDF jacket layer having the composition of test 8 was applied over the braid. It was confirmed that the cables exhibited low SDI values (below 15) when tested per NFPA-255 and had a PHV of only 2918 BTU/pound when tested per NFPA-259.

Thus, as opposed to what had previously been industry practice, it has now been discovered that LC Cables produced using PVDF can be used in all applications identified as requiring a Limited Combustible Cable or a Duct Cable and/or in all cable applications requiring a plenum rated product. PVDF is specifically chosen as the jacketing when the benefits of superior physical and mechanical properties are required, and the electrical properties of PVDF do not compromise cable performance. PVDF also has excellent abrasion resistance, cut-through resistance and creep resistance.

We claim:

1. A limited combustible (LC) Cable wherein one or more of the Cable components has a composition comprised of polyvinylidene fluoride (PVDF) and from about 0.05 to 0.5 weight %, based on the weight of the PVDF, of a flame and smoke suppressant, provided that the Cable contains—less than 50 weight % PVDF, based on the weight of the Cable wherein the PVDF comprises a homopolymer of PVDF or a copolymer prepared from at least 75 percent by weight of vinylidene fluoride monomer; wherein the LC cable has a potential heat value (PHV) below 3500 BTU/pound when tested by standard NFPA-259, and when tested by Standard NFPA-255 has a smoke developed index (SDI) below 50 and a flame developed index (FDI) below 25; and wherein the flame and smoke suppressant is selected from the group consisting of one or more of a tungstate, and a molybdate.

2. The Cable of—claim 1 wherein the PVDF-based Cable component has a limited oxygen index (LOI) of about 40–90.

3. The cable of—claim 1 wherein the PVDF-based Cable component has an LOI of about 43–75.

4. The LC Cable of claim 1 wherein the Cable component is a Cable jacket.

5. The LC Cable of claim 1 wherein the Cable component is a primary Cable insulation.

6. The LC Cable of claim 1 in the form of a coaxial cable.

7. The LC Cable of claim 1 containing a fiber optic member.

* * * * *